United States Patent [19]

Harvey-Rioux et al.

[11] Patent Number: 5,447,018
[45] Date of Patent: Sep. 5, 1995

[54] AQUATIC PLANT DE-ROOTING APPARATUS

[75] Inventors: Conrad Harvey-Rioux, London; Douglas E. Lyke, Wolseley, both of Canada

[73] Assignee: Triton Marine Industries Inc., Saskatchewan, Canada

[21] Appl. No.: 249,626

[22] Filed: May 26, 1994

[30] Foreign Application Priority Data

Jun. 3, 1993 [CA] Canada ................. 2097673

[51] Int. Cl.6 ............................................. A01D 44/00
[52] U.S. Cl. .......................................... 56/9; 37/343; 56/8
[58] Field of Search ............ 56/8, 9; 37/326, 329, 37/343; 171/43; 172/122, 123, 125

[56] References Cited

U.S. PATENT DOCUMENTS

| 733,360 | 7/1903 | Austin | 56/9 |
|---|---|---|---|
| 1,839,380 | 1/1932 | Druppel . | |
| 2,223,641 | 12/1940 | Sanger | 56/8 |
| 2,322,865 | 6/1943 | McDermott | 56/8 |
| 2,677,926 | 5/1954 | Washbourne et al. | 56/8 |
| 2,977,738 | 4/1961 | Hoover | 56/8 |
| 3,540,194 | 11/1970 | Chaplin | 56/9 X |
| 3,866,396 | 2/1975 | Meyer | 56/9 |
| 4,095,545 | 6/1978 | Vaughn et al. | 37/329 X |
| 4,202,155 | 5/1980 | Stewart | 56/9 |
| 4,501,111 | 2/1985 | Abbott | 56/8 |
| 4,520,616 | 6/1985 | Stewart et al. | 56/9 |
| 4,638,621 | 1/1987 | Stewart, III et al. | 56/9 |
| 4,840,232 | 6/1989 | Mayer . | |
| 5,142,849 | 9/1992 | Amimoto et al. | 56/8 |

FOREIGN PATENT DOCUMENTS 1173286 8/1984 Canada .

*Primary Examiner*—George A. Suchfield
*Attorney, Agent, or Firm*—Murray E. Thrift; Adrian D. Battison; Stanley G. Ade

[57] ABSTRACT

An aquatic plant de-rooting apparatus includes a jib and a vertically adjustable hanger to be mounted on a vessel. The hanger carries two forwardly convergent rotors, each with a series of flat blades projecting radially from it. The rotors are independently driven by hydraulic motors. The rotors act to uproot the aquatic vegetation to remove the vegetation and inhibits its future growth.

22 Claims, 4 Drawing Sheets

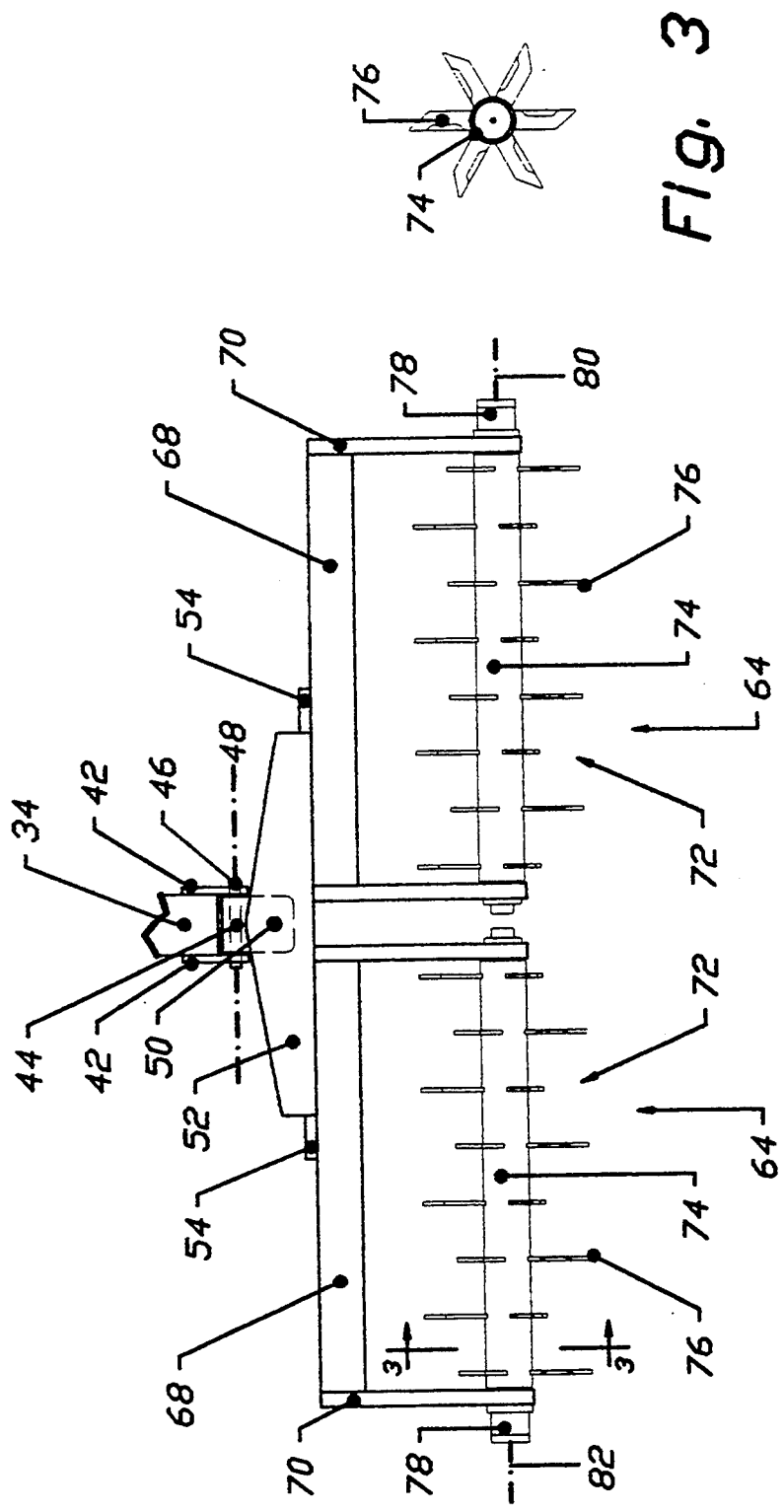

AQUATIC PLANT DE-ROOTING APPARATUS

FIELD OF THE INVENTION

The present invention relates to de-rooting of aquatic vegetation.

BACKGROUND

The different types of aquatic vegetation growth controlled by the present invention can be divided into two groups: submersed and emergent. Submersed aquatic vegetation is attached to the hydrosoil by roots. Generally, submersed aquatic vegetation grows in water depths between 0.5 and 2.5 meters. Emergent varieties depend on the water body for existence but grow primarily in shallow water or on the shoreline and are not able to grow in deep water.

Traditional mechanical methods available for aquatic plant control have been largely limited to two technological types: dredging and harvesting.

DREDGING:

Dredging was designed for deepening and widening water channels for water navigation and for creating canals and ditches for the passage of water. Attempts at using dredging for the control and removal of submersed aquatic vegetation was limited to shoreline areas where the dredger could reach and where the shoreline topography allowed the dredger access. The process did achieve limited success removing emergent aquatic vegetation, where access to the water edge, allowed a dredger to be mobilized to and along without obstructions barring its path for example on the groomed banks of a canal.

HARVESTINGS:

Harvesting has long been known as the most environmentally acceptable and most cost-effective method for control of aquatic vegetation. The procedure is accomplished using a self propelled harvester vessel equipped with an adjustable harvesting head attached to the front of the harvester which can be raised or lowered into the water. The bottom of the harvester head is equipped with a reciprocating sickle bar cutter which cuts the aquatic vegetation approximately 8 cm above the soil surface, up to a maximum water depth of 1.8 meters. The cut vegetation falls onto a conveyor which conveys the vegetation to the surface of the water and into a storage compartment of the harvester. When the storage compartment is full the harvester propels itself to shore where it hooks up to and conveys the harvested aquatic vegetation into a disposal trailer. Although regrowth of submersed aquatic vegetation is reduced in most cases, regrowth normally occurs every year after treatment. Because of annual regrowth, efforts have been made to design equipment that would remove the roots of aquatic vegetation rather than or in combination with harvesting to yield better and longer lasting control results.

The objectives of the present invention are to obtain a more productive and cost-effective method of de-rooting, than currently available. The process is intended to provide relief from regrowth as long as or longer than that achieved by other de-rooting equipment. The most notable technologies used prior to the present invention were the spring shanked cultivator and the rototiller.

CULTIVATOR:

One of the first aquatic implements used on a sizable scale for de-rooting nuisance aquatic vegetation was a terrestrial cultivator. It was pulled along shallow shoreline areas by a specially adapted muskeg tractor. The cultivator consisted of three rows of offset shanks each with a shovel or sweep attached to the bottom of the shank. The shanks were staggered in the rows to ensure complete overlap within the operating width. The cultivator shovels were set to penetrate 10 to 15 cm into the substrate. As they sliced below the root crown of the plant, they uprooted the plant and caused sufficient agitation to shake off the soil particles, allowing the root crown to float.

The terrestrial cultivator proved to be very unsafe because the uneven contour of lake bottoms caused tipping and sinking of the equipment. The process was slow and the equipment was limited to operating in a maximum water depth of 1.25 meters.

ROTOTILLER:

The rototiller was the next machine developed and is still used today in de-rooting operations. The rototiller head is equipped with L-shaped blades fixed to a hydraulically driven rotating shaft. The blades are very similar to those used on a conventional garden rototiller. The head is supported by two arms which are mounted on opposite sides of a paddlewheel-driven barge. These support arms pivot just behind the center of the barge and are raised and lowered by a cable winch mounted on the barge deck.

The rototiller process is slow and is limited in its usefulness by poor maneuverability. There is little or no positive guidance or tracking ability through stands of vegetation. It is used primarily in deep water between 2 and 4.5 meters. The design of the head makes it susceptible to damage by under water obstacles. Driving the L-shaped blades through the soil takes a considerable amount of power, resulting in low production.

With existing technology no one machine can remove and control aquatic vegetation in both shallow and deep water conditions. Nor is there a prior art machine available that can de-root both submersed and emergent aquatic vegetation. The low de-rooting productivity of available technologies also mean that existing de-rooting equipment is expensive to operate.

De-rooting with previously designed equipment creates large problems after a treatment is performed because of the floating debris left behind. It is necessary to bring in harvesters to skim up the floating debris in order to prevent it from reestablishing itself or from drifting to neighbouring sites and infecting areas which were not previously infected with vegetative growth. This necessitates either the use of two machines or de-rooting aquatic vegetation in the early spring or late fall when there are only roots to remove.

It is therefore desired to provide new or improved de-rooting apparatus that ameliorates problems with the prior art.

SUMMARY

According to one aspect of the present invention an aquatic plant de-rooting apparatus for mounting on a platform, said apparatus comprising:
  an elongate, laterally extending rotor means having a plurality of spaced apart, radiating teeth;
  rotor drive means for rotating the rotor means;
  suspending means for suspending the rotor means from the platform, the suspending means including pivot means allowing the rotor to roll substantially freely so as to conform substantially in orientation with the contour of an adjacent hydrosoil surface.

The term "roll" is used in its conventional sense, to mean a side-to-side rotation about a longitudinal axis. Similarly, "pitch" is used herein to designate a fore-and-aft rotation about a lateral axis.

The side-to-side rolling motion of the rotor allows the rotor to follow the contours of the hydrosoil to ensure treatment of a greater surface area, more reliably than with a fixed, horizontal rotor orientation. The rotor will also clear submerged obstacles by rolling up on one side or the other.

Preferably the suspending means include an upright hanger, with the pivot connected to the hanger adjacent the rotor. A jib connected to the hanger serves to mount the hanger on the platform and may be pivoted to raise and lower the rotor.

The hanger preferably has an adjustable length to accommodate different water depths.

According to another aspect of the present invention there is provided an aquatic plant de-rooting apparatus for mounting on a mobile platform, said apparatus comprising:

two elongate rotors arranged end-to-end and having respective axes intersecting at an obtuse angle, each rotor having a plurality of spaced apart, radiating teeth;

rotor drive means for rotating the rotor; and suspension means for suspending the rotors from the platform.

The de-rooter is normally advanced with the rotors converging to the front. This provides positive tracking of the apparatus as it travels through stands of vegetation. The teeth cut overlapping paths to ensure that the complete surface traversed is treated.

The rotors are preferably driven by independently controlled, reversible hydraulic motors to provide the operator with good control of the de-rooting process as well as the vessel on which the de-rooter is mounted.

The hanger pivot preferably provides for a controllably adjustable pitch rotation of the rotor so that it may follow the surface contours of the hydrosoil in the direction of travel.

According to a further aspect of the present invention there is provided an aquatic plant de-rooting apparatus comprising:

a vessel;
a container for receiving weeds carried by the vessel;
harvester means including:
  conveyor means;
  means for mounting the conveyor means on the vessel for picking up plants floating on a body of water and conveying the plants to the container;
de-rooter means including:
  jib means;
  means for mounting the jib means on the vessel;
  hanger means depending from the jib means;
  rotor means mounted on the hanger means and including a plurality of radiating teeth; and
  rotor drive means for rotating the rotor means.

The harvester and de-rooter attachments are preferably alternatively mountable on the vessel. They can be mounted using easily releasable pivot pins and quick-release hydraulic fittings for the rotor and conveyor drives.

An exemplary embodiment of the invention incorporating these and other features will be described in more detail in the following.

BRIEF DESCRIPTION OF THE DRAWINGS

In the accompanying drawings, which illustrate the exemplary embodiment of the present invention:

FIG. 2 is a rear view of the de-rotting head of the apparatus of FIG. 1;

FIG. 3 is a view along line 3—3 of FIG. 2;

DETAILED DESCRIPTION

Figure 4:
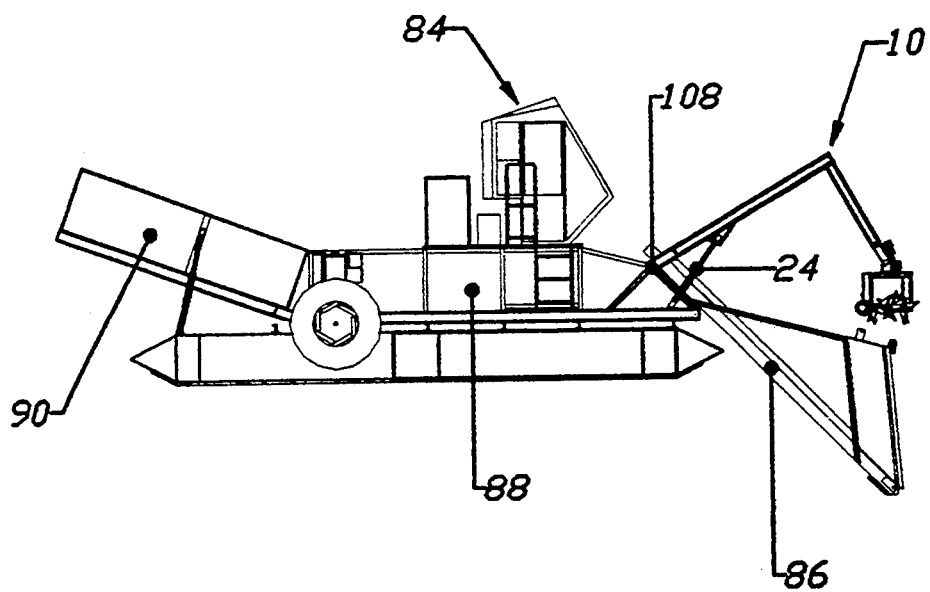
FIG. 4 is a side view of a harvester with the de-rooter attached.
Figure 5:
FIG. 5 is a side view of a de-rooter tooth.

Referring to the accompanying drawings there is illustrated a de-rooting apparatus 10 that mounts upon a harvester vessel 12 as illustrated in FIG. 4. The de-rooting apparatus includes a jib 14 with two parallel jib arms 16 joined by cross members 18. A lug 20 is mounted on the in-board or free end of each arm 16.

On the underside of each arm is a plate 22 that is pinned to the clevis on the piston rod of a cylinder 24. The two cylinders 24 are lift cylinders for the jib and for the de-rooting apparatus as a whole.

At the outboard of the jib is a hanger 26. This includes two angle braces 28 converging downwardly from opposite sides of the jib at its free end. A center brace 30 slopes downwardly to below the end of the jib from the center cross-member 18. These three braces 28 and 30 support a vertical sleeve 32. Sliding in the sleeve is a square tube 34. A series of holes 36 in the tube and two pins 38 through the sleeve 32 pin the tube adjustably to the sleeve so that the overall length of the hanger 26 can be adjusted.

At the bottom end of the tube 34 is a universal joint 40. This includes two side plates 42, connected to a yoke 44 by a lateral pin 46 to provide a lateral pitch axis 48. A longitudinal pin 50 connects the yoke between two laterally extending plates 52 mounted on a base plate 54. The longitudinal pin 50 has a fore-and-aft oriented roll axis 56.

A lug 58 is mounted on the tube 34 above the yoke 46 and a second lug 60 is mounted on a forward extension of pin 50, below the lug 58. These two lugs are linked by a pitch control means in the form of an hydraulic cylinder 62 that may be extended and contracted to control pitch movements about the lateral pitch axis 48. Carried on the base plate 54 are two rotors assemblies 64. They are arranged side-by-side but converging slightly in the normal direction of travel. Each rotor assembly includes a rotor frame 66 with a lateral head 68 and two depending side plates 70. Extending between the side plates is a rotor 72 including a rotor drum 74 and a series of rigid teeth 76 spaced uniformly over the drum surface to radiate from the drum surface. The drive means for the rotor is an hydraulic motor 78 connected to the outer end of the rotor drum at the outer end of the rotor frame 66. The two motors are independently controllable and reversible.

Figure 1:
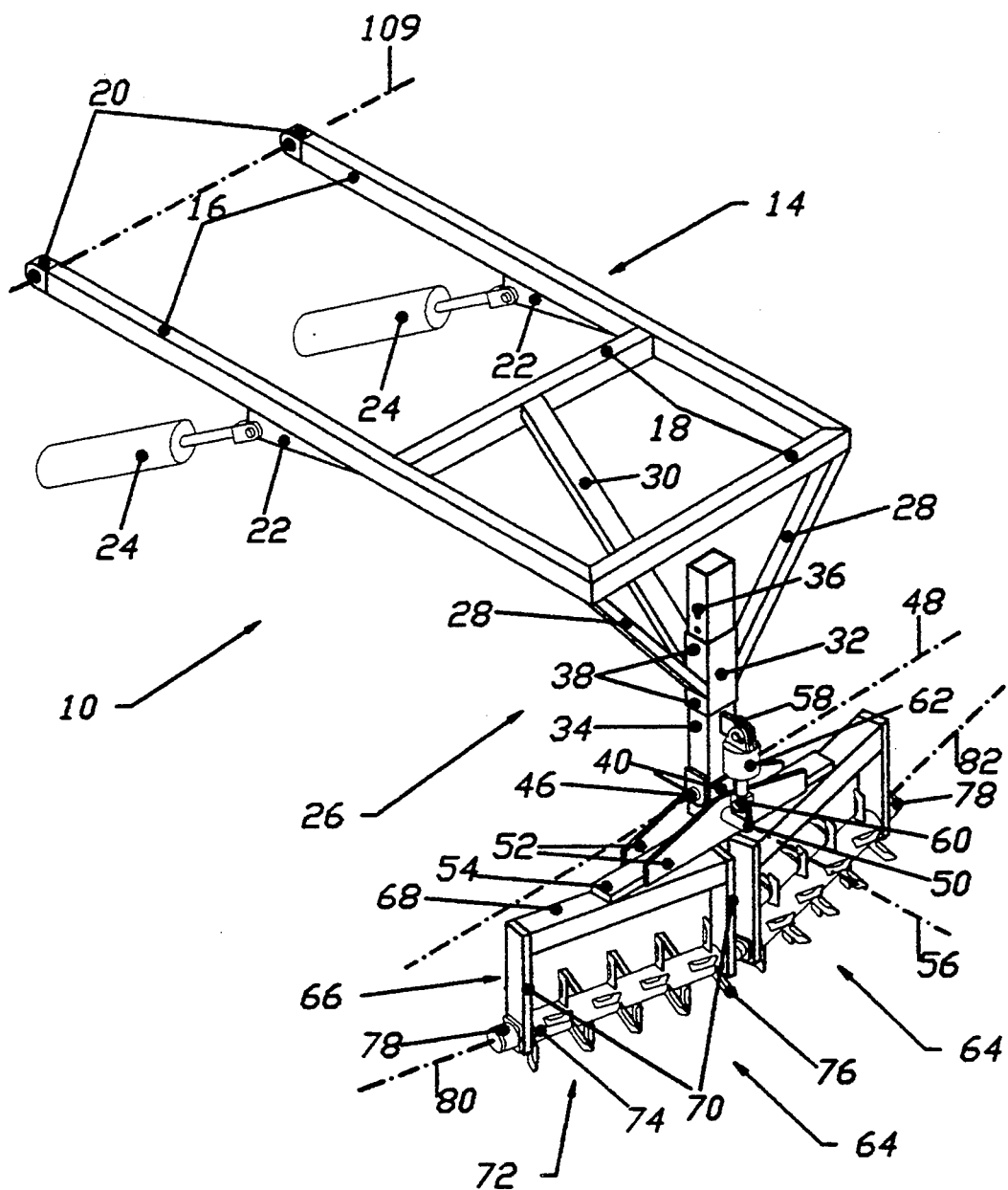
FIG. 1 is an isometric view of a de-rooting apparatus according to the present invention.

As illustrated most particularly in FIG. 1, the two rotors of the two rotor assemblies have respective rotor axes 80 and 82 that intersect at an obtuse angle.

The teeth 76 are flat plates uniformly distributed over the drum surface so that with the convergent drums, the plates will sweep substantially the complete surface being traversed as the rotors are advanced across the surface and simultaneously rotated.

FIG. 4 illustrates a vessel carrying the harvester. The vessel includes a superstructure 84 including an operator station with seating and the appropriate controls. The vessel may have mounted on it a harvester head 86 that extends into the water and serves to cut vegetation and to pick up floating vegetation from the surface of the water for delivery to a conveyor-bottom container 88 mounted amidships in the vessel. The vessel also includes an unloading conveyor 90 extending from the container to the rear of the vessel for off-loading the contents of the container. When the harvester head 86 is mounted on the vessel, the de-rooting apparatus 10 is dismounted and its hydraulic controls disconnected for connection to the harvester head.

Figure 6:
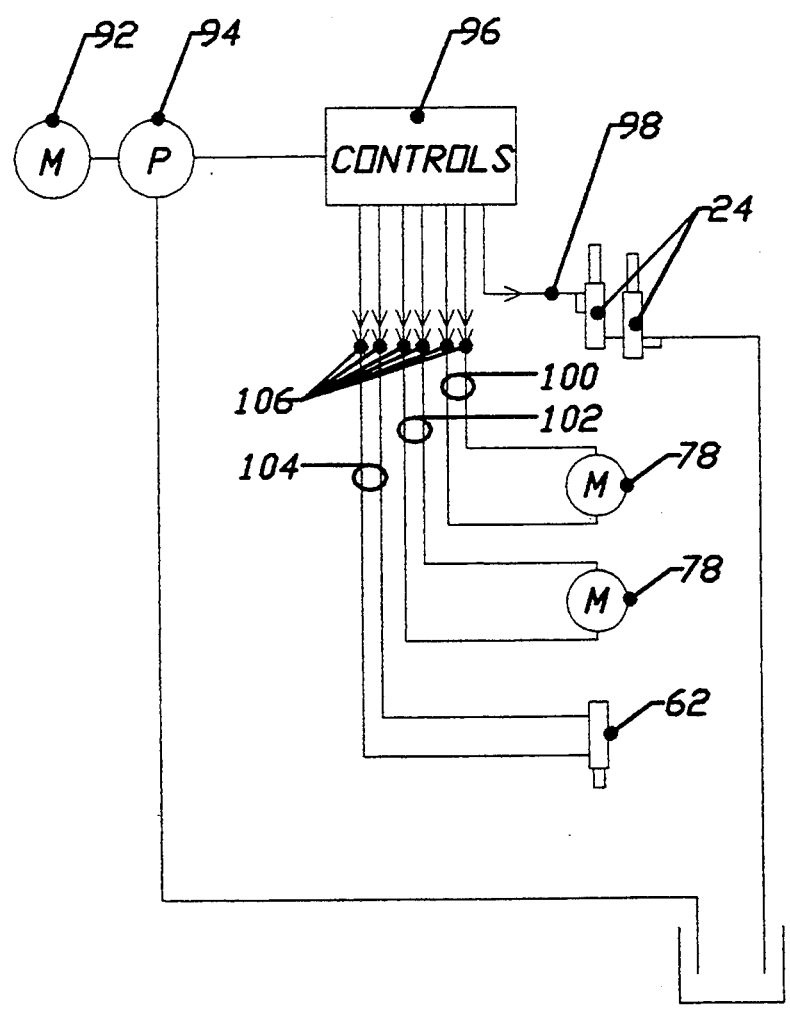
FIG. 6 is a hydraulic schematic.

The hydraulic controls for the system are illustrated most particularly in FIG. 6. As illustrated, the system includes a motor 92 driving an hydraulic pump 94. A set of controls 96 controls flow to the jib cylinders 24 through a line 98. Hydraulic lines 100 and 102 lead from the controls to the two hydraulic motors 78 for the rotors. Lines 104 deliver hydraulic fluid to the pitch cylinder 62. All of the hydraulic lines are equipped with quick release fittings 106 to enable the de-rooting head to be quickly disconnected when desired.

The jib 14 is connected to the vessel by two pins 108, aligned on a lateral jib axis 109 (FIG. 1) while the lift cylinders 24 are connected to the vessel by respective pins 110. A similar quick disconnect mechanism is used for the harvester head 86 so that the harvester head and the de-rooter apparatus may be connected to the vessel alternatively.

In use of the apparatus, the hanger length is adjusted to accommodate the water depth encountered. The jib lift cylinders act as jib control means to provide further adjustment that may be required during operation. When the de-rooter is lowered to the surface of the hydrosoil and the rotor is actuated, the teeth on the rotors sweep through the soil, loosening the soil and uprooting plants that are present. As the vessel advances, the rotors remain generally parallel to the adjacent hydrosoil surface due to the action of the rotor leveling means, including the roll axis pin 50 and the pitch axis pin 46 with pitch control cylinder 62. In use, the rotor may encounter underwater obstacles. The free pivoting movement about the roll axis will allow the rotors to clear most such obstacles automatically. This also allows the rotor to follow the lateral contours of the hydrosoil. The pitch movements are controlled by the operator to match, insofar as possible, the contour of the hydrosoil in the direction of travel.

Where any area has been treated and there is quantity of floating vegetation to be collected, the de-rooter apparatus may be dismounted from the vessel and replaced with the harvester, including the pickup conveyor, for collection of this material. The exchange is quite simple, involving the release and reconnection of a set of pins and a set of quick release hydraulic couplings.

While one embodiment of the present invention has been described in the foregoing, it is to be understood that other embodiments are possible within the scope of the invention. For example, the angle of convergence of the two rotors may vary widely, for example, between 120° and 180° (aligned rotors). The converging rotors arrangement is preferred because it provides improved tracking and allows each tooth to treat a wider swath of vegetation.

The present invention in its various aspects is to be considered limited solely by the scope of the appended claims.

We claim:

1. An aquatic plant de-rooting apparatus for mounting on a platform, said apparatus comprising:
   an elongate, laterally extending rotor means having a plurality of spaced apart, radiating teeth;
   rotor drive means for rotating the rotor means;
   suspending means for suspending the rotor means from the platform, the suspending means including pivot means allowing the rotor to roll substantially freely so as to conform substantially in orientation with the contour of an adjacent hydrosoil surface.

2. An apparatus according to claim 1 wherein the suspending means comprise an upright hanger, the pivot means being connected to the hanger adjacent the rotor means.

3. An apparatus according to claim 2 wherein the suspending means comprise a jib connected to the hanger and means for mounting the jib on the platform for pivoting movement about a lateral jib axis.

4. An apparatus according to claim 3 including jib control means for pivoting the jib about the jib axis.

5. Apparatus according to claim 2 including means for adjusting the length of the hanger.

6. An apparatus according to claim 1 wherein the rotor means comprise two rotors arranged end-to-end.

7. An apparatus according to claim 6 wherein the rotors have respective axes of rotation intersecting at an angle less than 180°.

8. An apparatus according to claim 6 wherein the pivot means comprise means for pivoting the rotors about a lateral pivot axis.

9. An apparatus according to claim 8 including pitch control means for controllably pivoting the rotors about the lateral pivot axis.

10. An aquatic plant de-rooting apparatus for mounting on a mobile platform, said apparatus comprising:
    two elongate rotors arranged end-to-end and having respective axes intersecting at an obtuse angle, each rotor having a plurality of spaced apart, radiating teeth;
    rotor drive means for rotating the rotors; and
    suspension means for suspending the rotors from the platform.

11. An apparatus according to claim 10 wherein the obtuse angle is at least 120°.

12. An apparatus according to claim 10 wherein the rotor drive means comprise independently controllable drive means for the respective rotors.

13. An apparatus according to claim 12 wherein the drive means comprise two hydraulic motors connected to respective ones of the rotors.

14. Apparatus according to claim 10 wherein the teeth comprise substantially flat teeth, each with leading and trailing edges that are circumferentially spaced with respect to the associated rotor.

15. Apparatus according to claim 10 wherein the suspension means comprise rotor leveling means for maintaining the axes of the rotors generally parallel to an adjacent hydrosoil surface.

16. Apparatus according to claim 15 wherein the suspension means include a universal joint above the rotors.

17. Apparatus according to claim 16 wherein the suspension means include pitch control means for controlling pitch movements of the rotor about the universal joint.

18. An aquatic plant de-rooting apparatus comprising:
   a vessel;
   a container for receiving weeds carried by the vessel;
   harvester means including:
      conveyor means; and
      means for mounting the conveyor means on the vessel for picking up plants floating on a body of water and conveying the plants to the container; and
   de-rooter means including:
      jib means;
      means for mounting the jib means on the vessel;
      hanger means depending from the jib means;
      rotor means mounted on the hanger means and including a plurality of radiating teeth; and
      rotor drive means for routing the rotor means.

19. Apparatus according to claim 18 wherein the harvester means and de-rooter means are mountable alternatively on the vessel.

20. Apparatus according to claim 18 wherein the means for mounting the jib means on the vessel comprise two releasable pivot pins for coupling the jib means and the vessel, and jib control means for joining the jib means to the vessel for controllably pivoting the jib means on the pivot pins.

21. Apparatus according to claim 20 wherein the jib control means comprise at least one hydraulic cylinder connected to the jib.

22. Apparatus according to claim 18 wherein the rotor drive means comprise a source of hydraulic fluid under pressure, hydraulic motor means connected to the rotor means and hydraulic lines including quick release fittings joining the source of fluid under pressure and the hydraulic motor means.

* * * * *